J. H. GENTRY.
VALVE GEAR.
APPLICATION FILED FEB. 12, 1913.
1,075,778.
Patented Oct. 14, 1913.
3 SHEETS—SHEET 3.
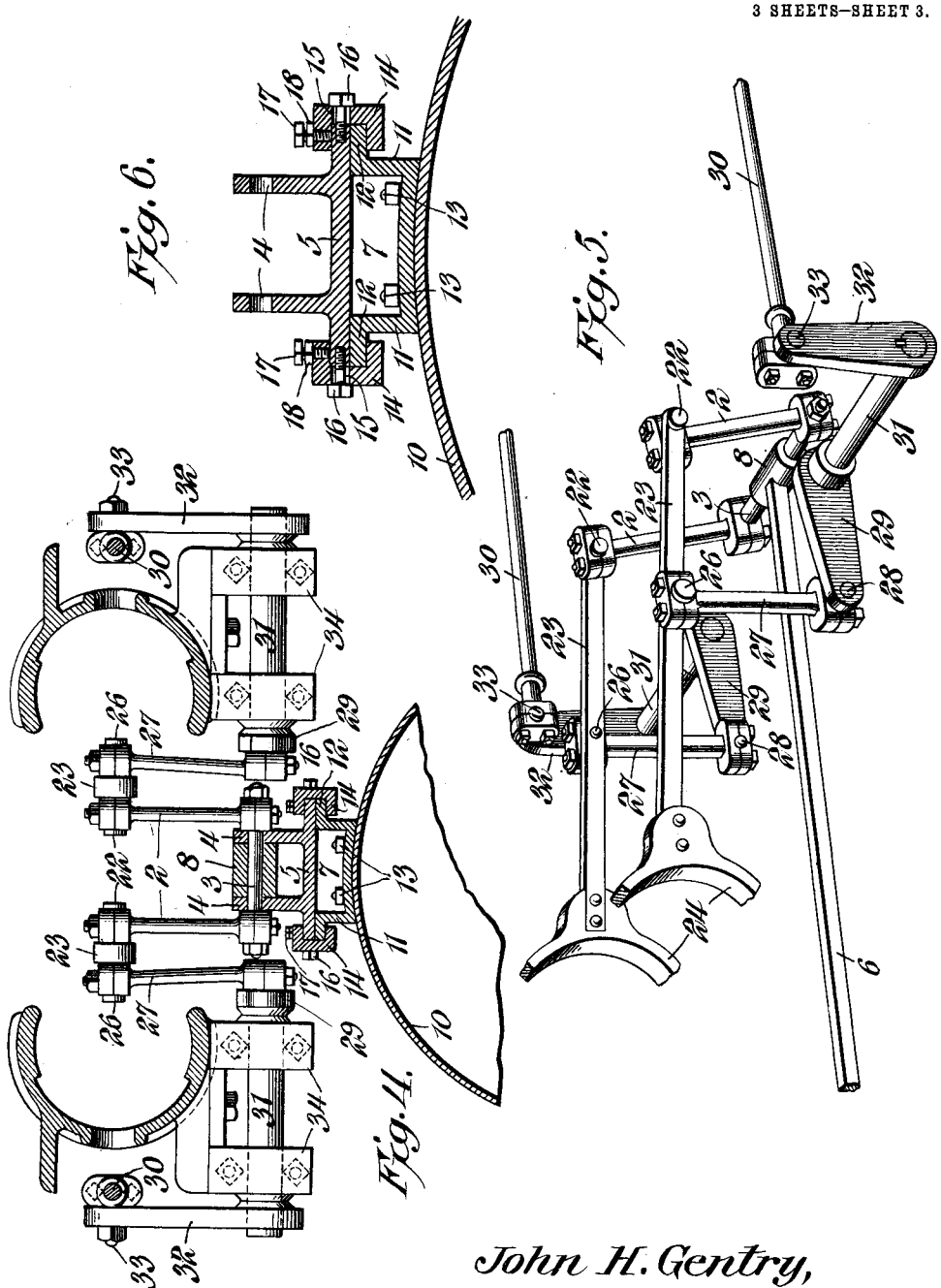
John H. Gentry,
INVENTOR,
WITNESSES
BY
ATTORNEY

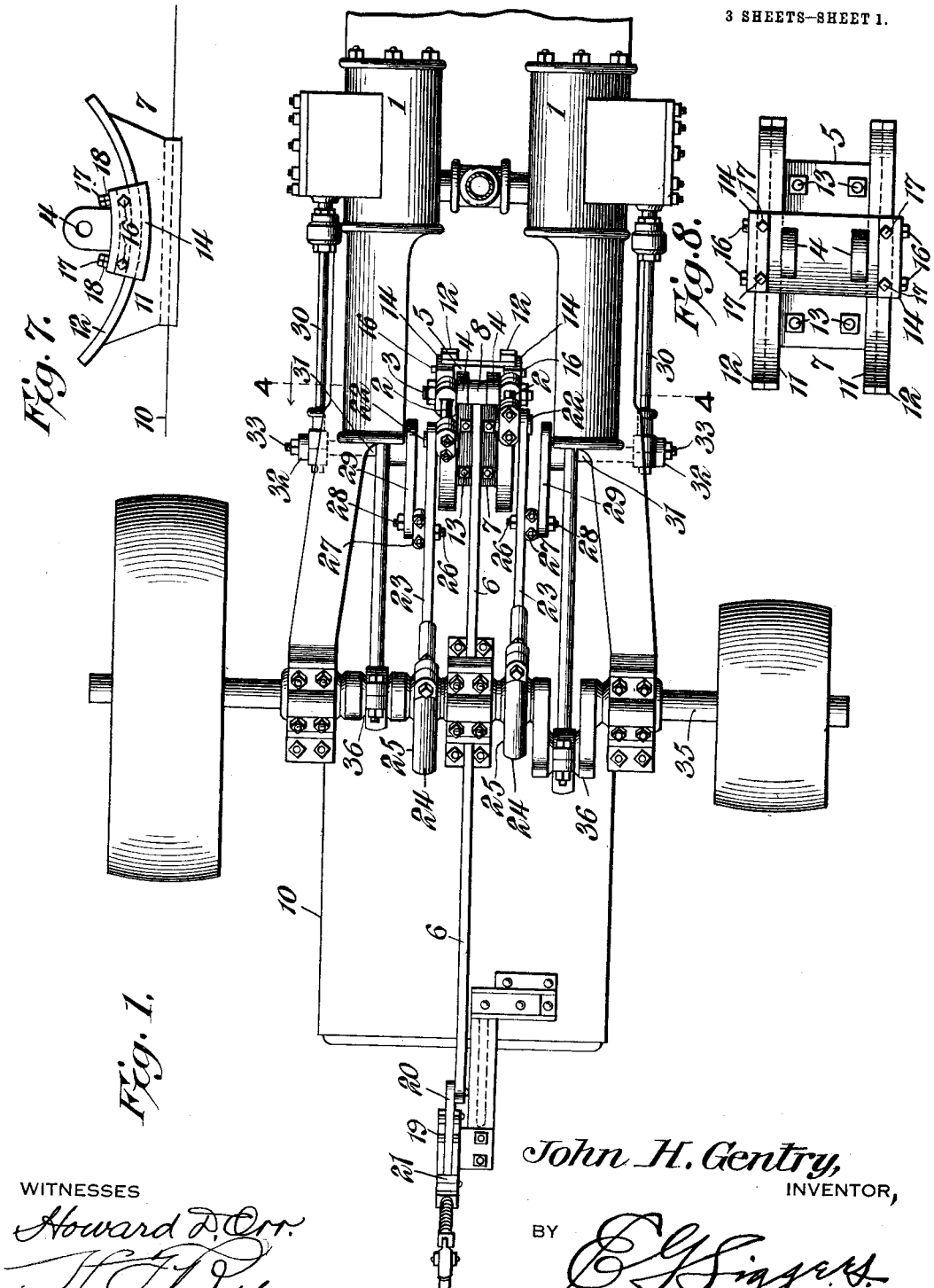

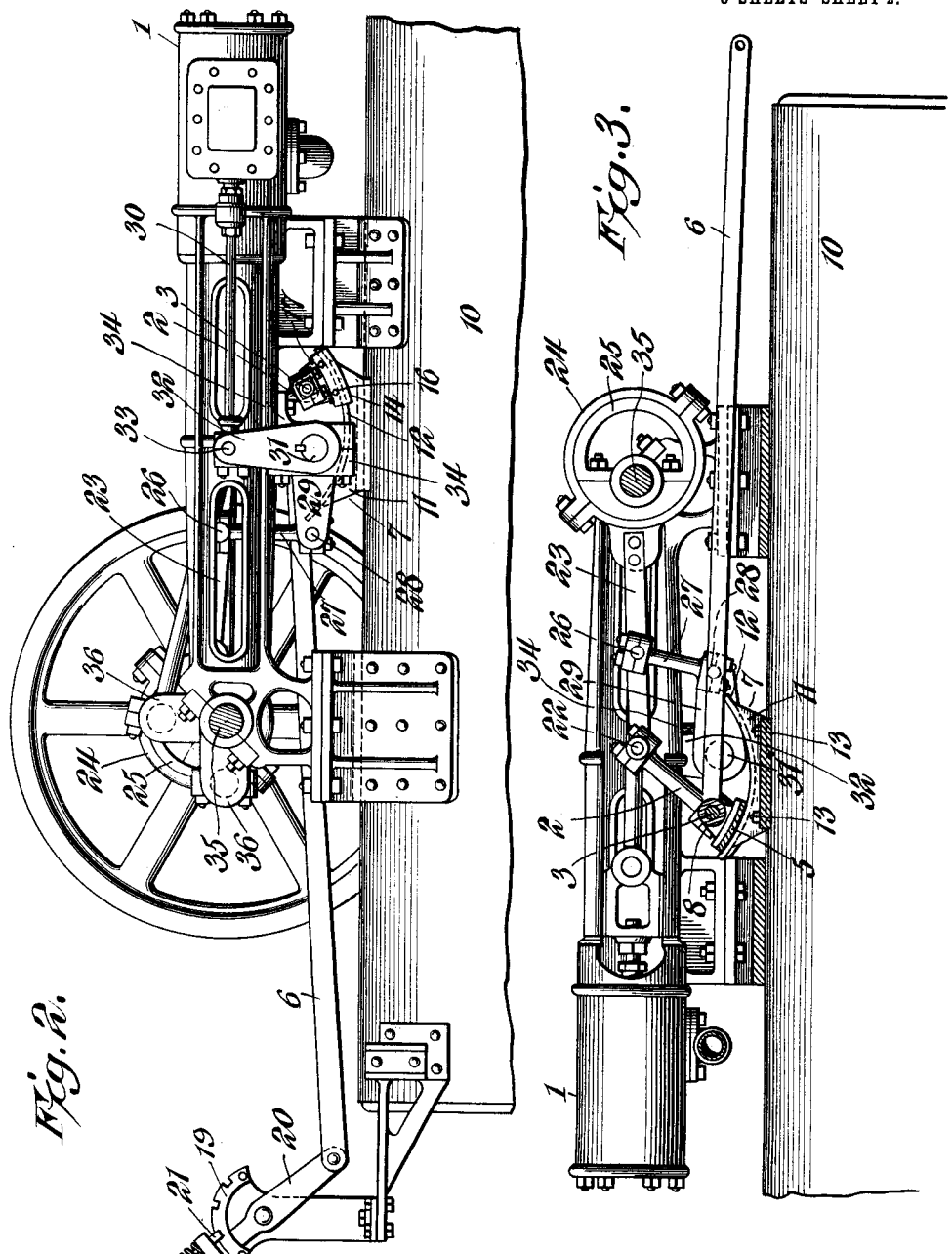

UNITED STATES PATENT OFFICE.

JOHN HENRY GENTRY, OF GREENTOWN, INDIANA.

VALVE-GEAR.

1,075,778.   Specification of Letters Patent.   Patented Oct. 14, 1913.

Application filed February 12, 1913. Serial No. 747,975.

*To all whom it may concern:*

Be it known that I, JOHN H. GENTRY, a citizen of the United States, residing at Greentown, in the county of Howard and State of Indiana, have invented a new and useful Valve-Gear, of which the following is a specification.

The invention relates to improvements in valve gear.

The object of the present invention is to improve the construction of valve gear, and to provide a simple and efficient valve gear, designed for use on double cylinder engines, and capable of eliminating from such structures the usual reverse link and having a slidably mounted radius link, adapted to reduce greatly the cost of manufacture and provide a firmer and more solid valve gear.

Another object of the invention is to provide a valve gear of this character, adapted to produce quick opening and closing of the ports, and capable of easy adjustment and of being retained in its adjustment by the pressure exerted on the pivoted end of the radius link.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view of a double cylinder engine, equipped with a valve gear, constructed in accordance with this invention. Fig. 2 is a side elevation of the same. Fig. 3 is a longitudinal sectional view, taken centrally through the valve gear. Fig. 4 is a transverse sectional view on the line 4—4 of Fig. 1. Fig. 5 is a perspective view of a portion of the valve gear, illustrating the arrangement of the radius links and the bell cranks for connecting the eccentric rods with the valve rods. Fig. 6 is an enlarged transverse sectional view of the reverse slide and the guide. Fig. 7 is a side elevation of the reverse slide and the guide. Fig. 8 is a plan view of the same.

Like numerals of reference designate corresponding parts in all the figures of the drawings.

In the accompanying drawings in which is illustrated the preferred embodiment of the invention, the valve gear, which is designed for use in connection with an engine having two cylinders 1, comprises in its construction a pair of inverted radius links 2, connected at their lower ends by a transverse pivot 3, which is mounted in spaced upwardly-projecting bearings 4 of an arcuate reverse slide 5, and connected with the forward end of a reach rod 6, adapted to move the reverse slide along an arcuate guide 7 to carry the radius links to either side of the center of the guide for reversing the engine, and to arrange them the desired distance from the center to obtain the desired amount of cutoff. The radius links are in a vertical position when arranged in their central or mid gear position centrally of the guide, which is of a length to permit an equal backward and forward adjustment of the radius links from such central position. The reach rod 6 is provided at its forward end with a head 8 extending across the space between the bearings 4, as clearly illustrated in Fig. 4 of the drawings. The guide 7, which is bolted or otherwise mounted upon the boiler 10 of the engine, is arched transversely to conform to the configuration of the boiler, and it is composed of a base or bottom plate, vertical longitudinal side webs or flanges 11, and laterally extending arcuate side flanges 12, projecting outwardly from the vertical webs or flanges at the upper edges of the same. The vertical webs or flanges 11 are located at the side edges of the base or bottom plate of the guide, and the bolts 13, or other fastening means for securing the guide to the boiler, are located in the space between the webs or flanges 11. The laterally extending arcuate flanges 12 are curved longitudinally, and the reverse slide, which consists of a curved plate, conforms to the configuration of and fits the upper faces of the laterally extending flanges 12 and is of a width coextensive with the guide, as clearly shown in Fig. 6 of the drawings. The upwardly extending bearings 4, which are preferably formed integral with the plate of the reverse slide, are spaced from the side edges thereof, and the said reverse slide is equipped with adjustable side pieces 14, which form grooves or ways to receive the laterally projecting flanges of the guide.

Each side piece, which is approximately U-shaped in cross section, is composed of upper and lower flanges and a vertical web or connecting portion, which is provided with vertically elongated openings or slots 15 for the reception of screws 16, which secure the side pieces to the side edges of the reverse slide. The reverse slide is provided with threaded bores to receive the screws 16, and the vertical elongation of the bolt openings or slots of the web or connecting portion of the side piece permits a vertical adjustment of the latter to take up the wear and maintain the bottom flange of the side piece in proper engagement with the lower face of the laterally extending flange of the guide. Each side piece is equipped with spaced adjusting screws 17, arranged in threaded openings in the top flange and bearing against the upper face of the reverse slide at the side portions thereof. The adjusting screws are equipped with lock nuts 18 for securing them in their adjustment. The reverse slide obviates the necessity of employing reverse links and greatly simplifies and strengthens the construction of the valve gear and lessens the cost of manufacturing same, and at the same time provides a more firm and solid valve gear than is possible when the radius link is carried by a reverse link. This construction also enables the valve gear to be easily adjusted, and the arcuate character of the slide balances the radius links in every adjustment of the same, and the pressure on the radius links operating against the arcuate reverse slide and the relative position of the same on the arcuate guide will, as has been found by experience, maintain the radius link in its adjustment without employing the notched segment 19, even when the engine is traveling at full speed under a maximum load. The rear end of the reach rod is shown connected to a lever 20, equipped with a spring actuated dog or detent 21 for engaging the notched segment 19, but the notches at the coacting dog or detent are not necessary and may be omitted.

The inverted radius links are pivoted at their upper ends by pins 22, or other suitable fastening devices to the forward ends of eccentric rods 23, secured at their rear ends to straps 24 of eccentrics 25 and connected at points intermediate of their ends by suitable pivots 26 to the upper ends of links 27. The links 27, which extend downwardly from the eccentric rods, are pivoted at their lower ends by pins 28, or other suitable fastening devices to inner approximately horizontal rocker arms 29 of the bell cranks, which connect the links with the valve rods 30. The bell cranks, which are spaced apart, are composed of the said inner rocker arms 29, transversely alined rock shafts 31, and outer rocker arms 32 extending upwardly from the outer ends of the rock shafts 31, and connected at their upper ends by suitable pivots 33 with the rear ends of the valve rods 30. The transversely alined rock shafts 31 are journaled in suitable bearings 34 at opposite sides of the engine. The eccentrics, which are mounted on the crank shaft 35 of the engine, must be set ninety degrees ahead of the cranks 36, as this arrangement is essential to the operation of the valve gear. When the crank shaft rotates, the backward and forward longitudinal movement of the eccentric rods is modified by the arcuate movement of the radius link and an up and down movement is imparted to the depending links 27 for actuating the rock shafts and motion is communicated therefrom through the upwardly extending outer rocker arms to the valve rods, which are thereby reciprocated. The radius links, which are connected to the eccentric rods at the inner faces thereof, operate in the nature of toggles to produce an easy up and down movement of the depending links, which are arranged at the faces of the eccentric rods. By employing the inverted radius links, as pointed out in my prior Patent, No. 1,022,232, the steam engine is relieved of much of the load incident to the reciprocation of the valves, and the latter are actuated at the expenditure of a minimum amount of power.

While the valve gear is shown applied to a double engine, the manner of mounting the inverted radius link may be advantageously employed in various other forms of engines, whether of the double cylinder or single cylinder type.

What is claimed is:—

1. The combination with an eccentric rod, of a valve gear including an inverted radius link connected at its upper end with the eccentric rod, a reverse slide connected with the lower end of the radius link and forming a support for and carrying the same, and a fixed guide upon which the reverse slide is mounted.

2. The combination with an eccentric rod, of a valve gear including an inverted radius link, a guide, a reverse slide movable along the guide and connected with and supporting the radius link, and operating means connected with and adapted to move the reverse slide along the guide.

3. The combination with an eccentric rod, of a valve gear including an arcuate guide, an arcuate reverse slide movable along the guide, and an inverted radius link carried by the reverse slide and connected at its upper end with the eccentric rod.

4. The combination with an eccentric rod, of a valve gear including an inverted radius link pivoted directly at its upper end to the eccentric rod, a reverse slide carrying the radius link, means for guiding the reverse slide, and a bell crank connected with the eccentric rod for transmitting motion to a valve.

5. The combination with an eccentric rod, of a valve gear including an inverted radius link pivoted directly at its upper end to the forward end of the eccentric rod, a reverse slide connected with the lower end of the radius link and supporting the same, means for guiding the reverse slide, a link connected to the eccentric rod at a point intermediate of the ends thereof, and a bell crank for transmitting motion from the last-mentioned link to a valve.

6. The combination with an eccentric rod, of a valve gear including a fixed guide provided at opposite sides with laterally extending arcuate flanges, an arcuate reverse slide fitted against the said flanges and provided with means for slidably interlocking it with the same, and a radius link pivoted to and carried by the reverse slide and connected with the eccentric rod.

7. The combination with an eccentric rod, of a valve gear including a fixed guide provided at opposite sides with laterally extending arcuate flanges, an arcuate reverse slide fitted against the said flanges, side pieces arranged at opposite sides of the guide and the reverse slide and secured to one of the parts and slidably embracing the other of such parts, means for adjusting the side pieces to take up the wear, and a radius link pivoted to the reverse slide and connected with the eccentric rod.

8. The combination with an eccentric rod, of a valve gear including a guide provided with laterally extending flanges, a reverse slide fitted against the said flanges, approximately U-shaped side pieces slidably embracing the said flanges and the side portions of the reverse slide, means for securing the side pieces to the reverse slide and for adjusting them on the same to maintain them in proper engagement with the said flanges, and a radius link pivoted to the reverse slide and connected with the eccentric rod.

9. The combination with a pair of eccentric rods, of a valve gear including a guide, a reverse slide mounted on the guide and having spaced bearings, radius links arranged at the outer sides of the said bearings and connected with the eccentric rods and provided with a connecting pivot mounted in the bearings, and a reach rod connected with the said pivot and arranged between the spaced bearings.

10. The combination with a pair of eccentric rods and valve rods, of a valve gear including a fixed guide, a slide mounted on the guide and having bearings, inverted radius links having a connecting pivot mounted in the said bearings of the slide, said radius links being connected to the eccentric rods, spaced transversely alined rock shafts having inner and outer arms connected, respectively, with the eccentric rods and the valve rods, and operating means for adjusting the slide.

In testimony, that I claim the foregoing as my own, I have hereto affixed my signature in the presence of two witneses.

JOHN HENRY GENTRY.

Witnesses:
B. F. GENTRY,
TEME L. WILLIAMS.

---

Copies of this patent may be obtained for five cents each, by addressing the "Commissioner of Patents, Washington, D. C."